2 Sheets—Sheet 1.
J. T. FIFE.
Bee-Hive.
No. 224,589. Patented Feb. 17, 1880.
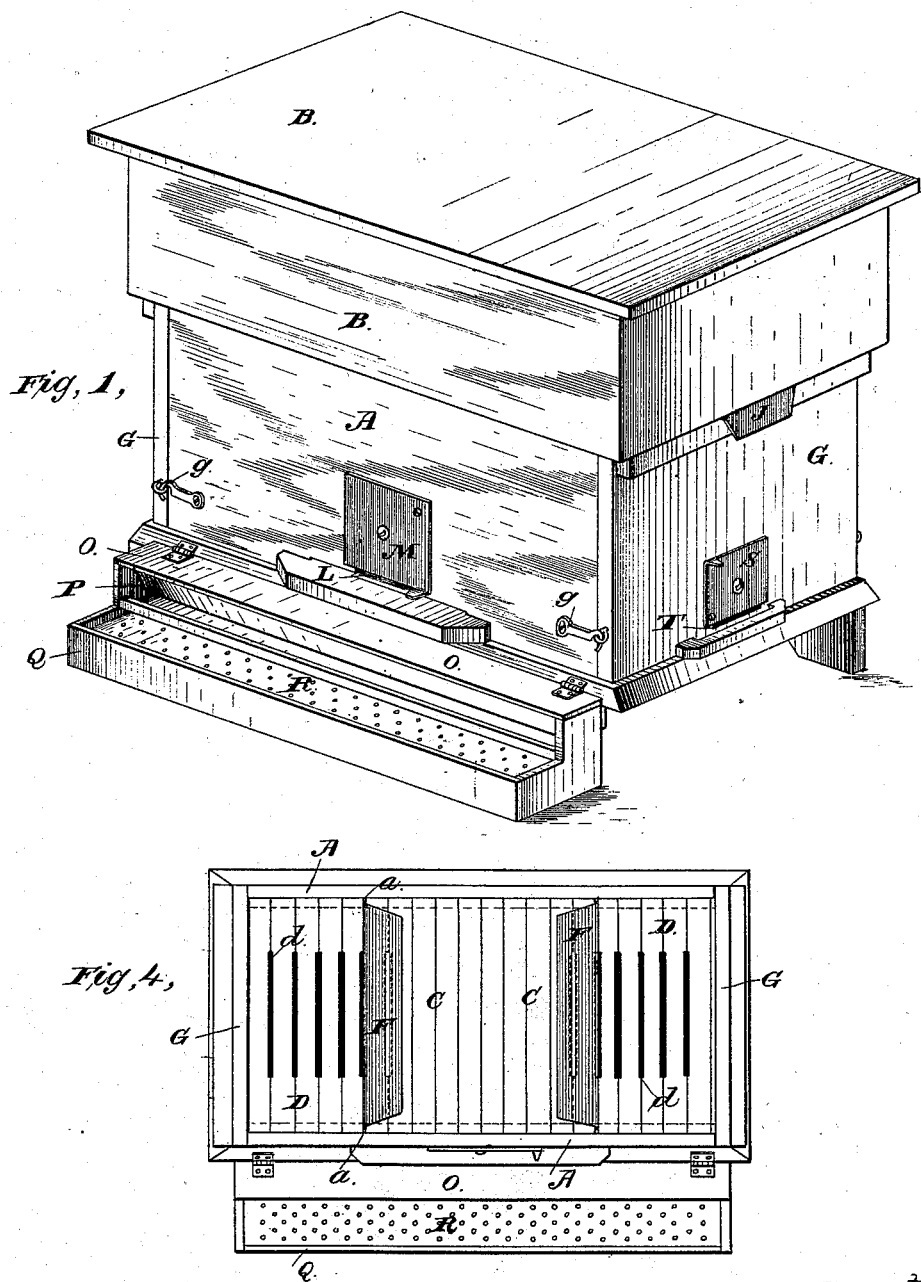

2 Sheets—Sheet 2.
J. T. FIFE.
Bee-Hive.
No. 224,589. Patented Feb. 17, 1880.
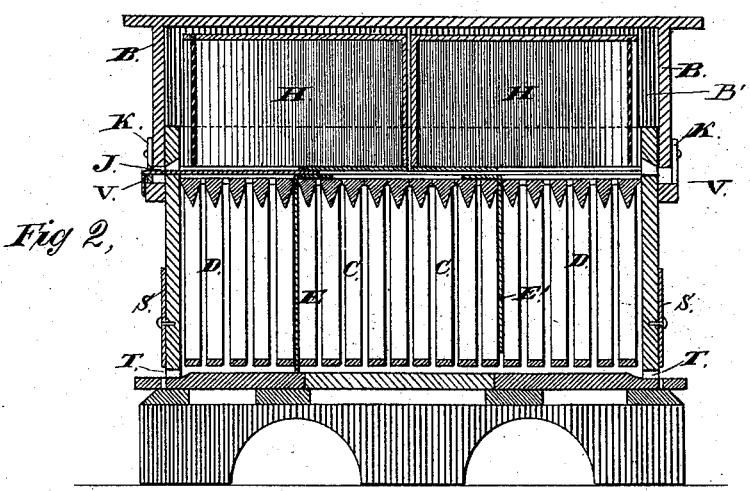
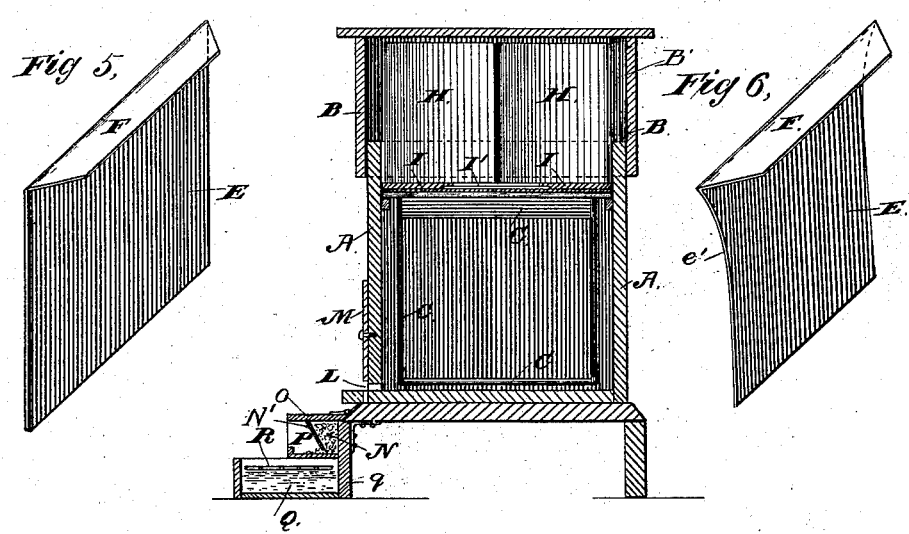
Attest
Geo. T. Smallwood Jr.
Chas. J. Gooch
Inventor:
James T. Fife
By Knight Bros
attys.

UNITED STATES PATENT OFFICE.

JAMES T. FIFE, OF CORNING, IOWA.

BEE-HIVE.

SPECIFICATION forming part of Letters Patent No. 224,589, dated February 17, 1880.

Application filed July 7, 1879.

*To all whom it may concern:*

Be it known that I, JAMES T. FIFE, of Corning, in the county of Adams and State of Iowa, have invented new and useful Improvements in Bee-Hives, of which the following is a specification.

My improved hive consists of an upper and lower compartment, which in ordinary working may be thrown together, so as to be practically one. They are separated in part by side boards extending from end to end above the comb-frames, and reaching from each side about one-third across the hive toward the center, leaving a hall of about one-third the width of the hive, extending from end to end, through which the bees may pass on top of the comb-frames.

A top box or dome is employed to darken and completely inclose the honey-box chamber, and, by means of buttons and slides, to raise and isolate the same when required, for the purpose of excluding bees therefrom and by imprisoning any bees therein during a portion of the day, causing them to escape therefrom when the dome is raised in the after part of the day, when they will return to the bee-home, which has been separated from the store-boxes and end combs. The said boxes and end combs may then be approached and removed without danger of encountering the bees.

In order that my invention may be fully understood, I will proceed to describe it with reference to the accompanying drawings, in which—

Figure 1 is a perspective view of my improved hive with salt-trough and water-trough attached. Fig. 2 is a vertical longitudinal section of the same on the line 2 2, Fig. 3. Fig. 3 is a transverse section on the line 3 3, Fig. 2. Fig. 4 is a plan of the lower part with the dome and honey-boxes removed. Figs. 5 and 6 are perspective views of flanged dividers used for different purposes, as hereinafter described.

A A represent the walls of the main body of the hive, and B the upper box or dome by which the body A is surmounted. C C represent the central comb-frames, made with parallel-sided bars, adapted to fit closely together, so as to form a tight floor. D D are comb-frames similar in construction, excepting that the central portion of their upper bars is narrowed, so that when the said frames are in position slots will be formed between them, as shown at *d*, for the passage of bees up and down.

E E represent vertical dividers, passed in from above at any desired points, within grooves *a* in the sides A A, and provided with flanges F, which lie horizontally on the top of the comb-frames, and may serve to cover any desirable number of the slots *d*.

Honey-boxes may be substituted for the comb-frames D in the end sections of the hive.

The hive is made with removable ends G, secured by hooks *g*, and permitting the removal of the end comb-frames, D, or boxes used in place thereof. When the bees are excluded from these end chambers of the hive the said chambers may be employed for storage all through the winter.

H H are the honey-boxes, resting upon longitudinal side boards, I, which extend along the sides of the hive from end to end on top of the comb-frames, each of the said side boards being of about one-third the width of the hive, so that the hall I' is left, permitting the free passage of the bees from end to end beneath the honey-boxes and between the side boards. At each end of this hall is an exit, J, which is closed by the top box, B, when the latter is down in its normal position, as in ordinary working. When the storage-chambers have been separated from the bee-home preparatory to the removal of comb, the top box, B, is raised and supported by a suitable block or button, as shown at K, to allow the escape of imprisoned bees through the exit J.

L represents the main entrance to the brood-chamber or home of the bees, said entrance being protected by an eccentrically-pivoted door, M, as described in Letters Patent No. 206,714, granted to me the 6th of August, 1878, the said door being adapted to expose the whole area of the entrance L, or completely close it for confining the bees, or to partially close it in such a manner as to permit the entrance or exit of working-bees, while excluding drones.

N represents a receptacle for salt, covered by a hinged lid, O, having its front portion of inwardly-converging or funnel shape, to insure the automatic delivery of the salt to a trough, P, underneath as fast as it is used. This construction of trough is valuable for all kinds of stock. The cover protects the salt from the weather, and the construction of the receptacle protects it from becoming foul, and the combination of trough and receptacle adapts the salt to be delivered in small quantities as fast as used, so that animals of all kinds may take salt in any desired quantity and as often as they please.

Q represents a water-trough, which I apply to any desirable number of hives, in the manner shown or in any preferred way, for the purpose of providing water for the bees. This device I have found very useful in preventing the annoyance and difficulty of bees frequenting the watering-troughs of large stock, which often results in the interference of the bees with the stock, and, where the bees are in large numbers, the complete exclusion of large stock from the troughs as well as the destruction of many bees by drowning. A perforated board, R, floating on the water within the trough Q, permits the bees to take the water freely and without danger to themselves.

The back board, q, of the water-trough extends upwardly and forms the back of the salt-trough, the bottom of which is secured at its inner edge to said back board. The cover O of the salt-receptacle serves conveniently as an alighting-board for the entrance L.

S S are end shutters or doors, similar in construction to the door N, and employed to cover or close the end entrances, T T, by which access is had to the end comb-frames, D, when necessary—as, for example, while raising two or more colonies in one hive.

For confining the queen within the brood-chamber while permitting the working-bees to pass to the end comb-frames, D, I employ a divider, E', of the form shown in Fig. 6, said divider being shorter, so as to permit the bees to pass underneath it, and having scallops e' in its edges, allowing the bees to pass around the sides. The well-known habit of the queen to proceed in a circle or ellipse in laying her eggs will cause her to be arrested before passing into the end combs, so that she will pass around and around within the proper brood-chamber or home of the bees, while the working-bees are permitted freely to pass to the end frames for making comb or depositing honey. Vertical grooves a are formed at suitable places in the rabbets or shoulders which support the comb-frames, in order to permit the introduction of the dividers at the points where it may be desired to use them. One pair of these grooves is provided, as shown, at the center of the hive for the introduction of a divider when it is desired to separate a swarm into two, making two colonies in one hive, or for the purpose of preventing swarming. The flanges F of the dividers are turned inwardly toward the center, as shown in Fig. 4, when it is desired to completely isolate the home of the bees and prevent bees from passing up therefrom into the honey-boxes. If the said flanges are turned in the other direction or over the end frames, as shown in dotted lines in Fig. 4, the slots in the central comb-frame, C, which were previously covered by them, will be opened, so as to permit the passage of the bees up and down.

V V are slides passing in through the end apertures, J, for the purpose of closing the slots between the end comb-frames when desired to separate the honey-boxes from the end compartments, while the bees are prevented from passing into the end frames, so that the bee-keeper may remove honey from a part of the hive at a time, or may employ the isolated end compartment for raising queens. He is thus enabled to arrange his hive for ordinary use, with a central home for brood and living, and the entire upper compartment and end sections accessible therefrom for storage, or to separate the bee-home from any or all of the said storage-compartments, and avoid danger of encountering bees therein when removing the combs, or to separate the body of the hive into two or three brood-compartments for dividing swarms or raising queens.

This construction of hive and the dividers employed therewith will be seen to permit the manipulation of bees in all the different modes practiced by experienced apiarians.

The scalloped vertical slides or dividers E', being narrower than the dividers E, may be passed between the comb-frames C or D at any point, requiring no grooves a.

Having thus described my invention, the following is what I claim as new therein and desire to secure by Letters Patent:

In a bee-hive, the close-topped frames C, open-topped frames D, superposed honey-boxes H, the side boards, I I, forming a central hall, I', extending from end to end, exits J at each end of the hive above the comb-frames, block or button K, and slide V, substantially as set forth.

JAMES T. FIFE.

Witnesses:
  OCTAVIUS KNIGHT,
  W. E. GUY.